United States Patent
Han et al.

(10) Patent No.: US 7,480,079 B2
(45) Date of Patent: Jan. 20, 2009

(54) SYSTEM AND METHOD FOR SEQUENTIAL KERNEL DENSITY APPROXIMATION THROUGH MODE PROPAGATION

(75) Inventors: Bohyung Han, Silver Spring, MD (US); Dorin Comaniciu, Princeton Jct., NJ (US); Ying Zhu, Monmouth Junction, NJ (US); Xiang Sean Zhou, Plainsboro, NJ (US)

(73) Assignee: Siemens Corporate Research, Inc., Princeton, NJ (US)

( * ) Notice: Subject to any disclaimer, the term of this patent is extended or adjusted under 35 U.S.C. 154(b) by 903 days.

(21) Appl. No.: 10/936,607

(22) Filed: Sep. 8, 2004

(65) Prior Publication Data

US 2005/0114103 A1 May 26, 2005

Related U.S. Application Data

(60) Provisional application No. 60/501,546, filed on Sep. 9, 2003.

(51) Int. Cl.
*G06K 15/00* (2006.01)
*H04N 1/405* (2006.01)

(52) U.S. Cl. .............. 358/3.24; 358/3.26; 358/1.17

(58) Field of Classification Search ............... 358/3.01, 358/3.06, 3.1, 3.14, 3.15, 3.21, 3.24, 464
See application file for complete search history.

(56) References Cited

U.S. PATENT DOCUMENTS

| 5,495,540 | A | * | 2/1996 | Frankot et al. ............. 382/294 |
| 2003/0147558 | A1 | * | 8/2003 | Loui et al. ................. 382/225 |
| 2004/0086174 | A1 | * | 5/2004 | Sun ............................ 382/154 |

OTHER PUBLICATIONS

"Sequential Kernel Density Approximation Through Mode Propagation: Applications to Background Modeling" by Han et al, published in Asian Conference on Computer Vision 2004.*

* cited by examiner

*Primary Examiner*—Edward L Coles
*Assistant Examiner*—James A Thompson
(74) *Attorney, Agent, or Firm*—Donald B. Paschburg; F. Chau & Associates, LLC

(57) ABSTRACT

A system and method for sequential kernel density approximation uses mode propagation to determine mode locations by the mean-shift method and reduce the generated modes. Hessians are calculated corresponding to the mode locations to determine the covariance. Density is approximated to update the density function depending on whether the Hessian is a negative indefinite.

31 Claims, 13 Drawing Sheets

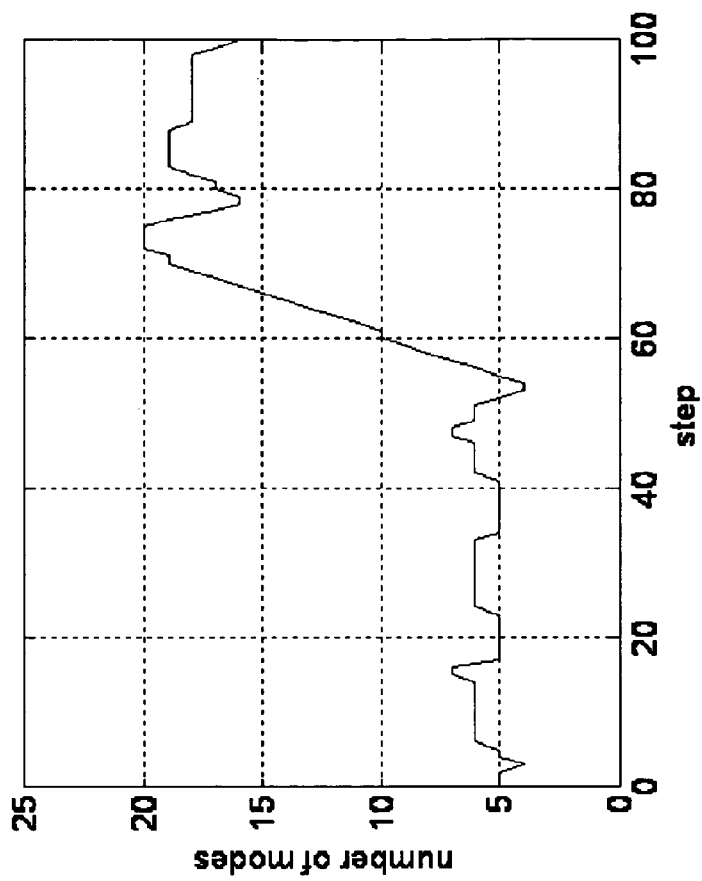
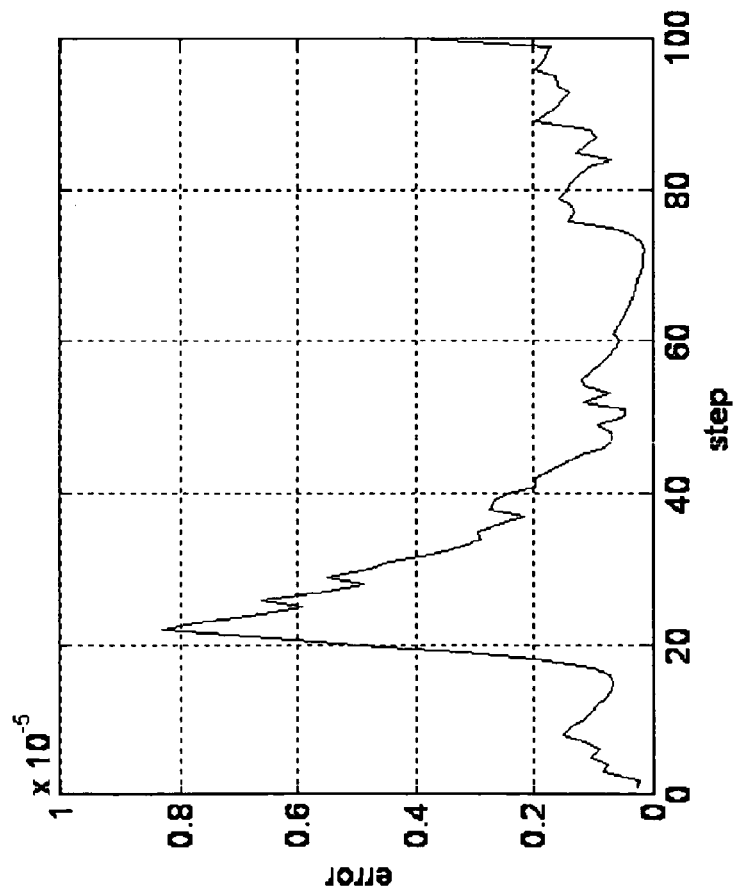
FIG. 3(e)
FIG. 3(f)

US 7,480,079 B2

SYSTEM AND METHOD FOR SEQUENTIAL KERNEL DENSITY APPROXIMATION THROUGH MODE PROPAGATION

CROSS-REFERENCE TO RELATED APPLICATION

This application claims the benefit of U.S. Provisional Application No. 60/501,546 filed on Sep. 9, 2003, titled as "Sequential Kernel Density Approximation through Mode Propagation: Applications to Background Modeling", contents of which are incorporated herein by reference.

TECHNICAL FIELD

This invention relates to statistical signal processing and more particularly to density approximation and mode propagation in signal processing applications.

DISCUSSION OF THE RELATED ART

It is very difficult to process signal in a raw form, because of problems of noises or missing data. Hence, researchers have developed mathematical and statistical techniques for an efficient management of signals. Probability density function is one of the most important tools to model the signal, and density based modeling, such as non-parametric techniques or mixture of Gaussians, and is now also widely used in computer vision area.

The details of density based modeling for visual features in an exemplary application area of computer vision are described next. Visual features such as intensity, color, gradient, texture or motion are commonly modeled using density estimation. The underlying probability density of the feature can be described using a parametric (e.g., one Gaussian), semi-parametric (mixture of Gaussians) or non-parametric (e.g., histogram or kernel density-based) representation. These representations create a trade-off between the flexibility of the model and its data summarization property. Non-parametric models, for example, can be very flexible and hence accommodate complex densities, but require large amounts of memory for the implementation.

Parametric and semi-parametric representation can be implemented in various methods in image processing applications. Underlying models for image processing applications can range from a Gaussian described by variable mean and covariance in a color space to a mixture of fixed number of Gaussians where density is updated using online K-means approximation.

A competitive alternative to the mixture model is a non-parametric representation, where kernel density estimation is invoked to estimate the probability density function. Non-parametric techniques give more flexibility in representing variations, but such techniques require a huge amount of extra memory because all the observations have to be recorded. Even more memory is required if the feature space is high dimensional. Hence, some memory-efficient density estimation technique is required.

A number of real-time computer vision tasks such as background modeling or modeling the appearance of a moving target require sequential density estimation, where new data is incorporated in a model as it becomes available. However, conventional methods for updating the density function either lack flexibility because they fix the number of Gaussians in the mixture, or require large amounts of memory by maintaining a non-parametric representation of the density.

SUMMARY

The modes of a density function represent regions with a higher local probability, and hence the preservation of modes is important to maintain a low density approximation error. In this method, kernel density approximation is utilized, where the density mode is detected and each mode is simulated by the Gaussian kernel.

A Gaussian mixture approximates the original density function by finding mode locations and estimating the curvature around each mode. For each mode, a Gaussian component is created, whose mean is given by the mode location. The covariance of each component is derived from a Hessian matrix estimated at the mode location. Variable-bandwidth mean shift is used to detect the modes. While the density representation is memory efficient (which is typical for mixture densities), it inherits the flexibility of non-parametric techniques, by allowing the number of modes to be adaptive. Therefore, density is represented as a weighted sum of Gaussians, whose number, weights, means and covariances are determined automatically at each time step, to include the new data into the model.

A technique for recursive density approximation that relies on the propagation of the density modes is also provided. Beginning from the previous modes, a new observation is considered at each time step, and the variable-bandwidth mean shift is used to detect the new modes. At each time step, the mean and the covariance for each mode is determined as explained above. Density based representations through mode propagation require lesser memory, similar to the techniques that use mixture densities, while modes are created and deleted in the more principled manner. The same mode detection and propagation techniques are applied to subspaces derived from eigen analysis.

BRIEF DESCRIPTION OF DRAWINGS

Preferred embodiments of the invention are described with reference to the accompanying drawings, of which.

DETAILED DESCRIPTION OF THE PREFERRED EMBODIMENTS

The preferred embodiments of the present invention will be described with reference to the appended drawings.

Figure 1:
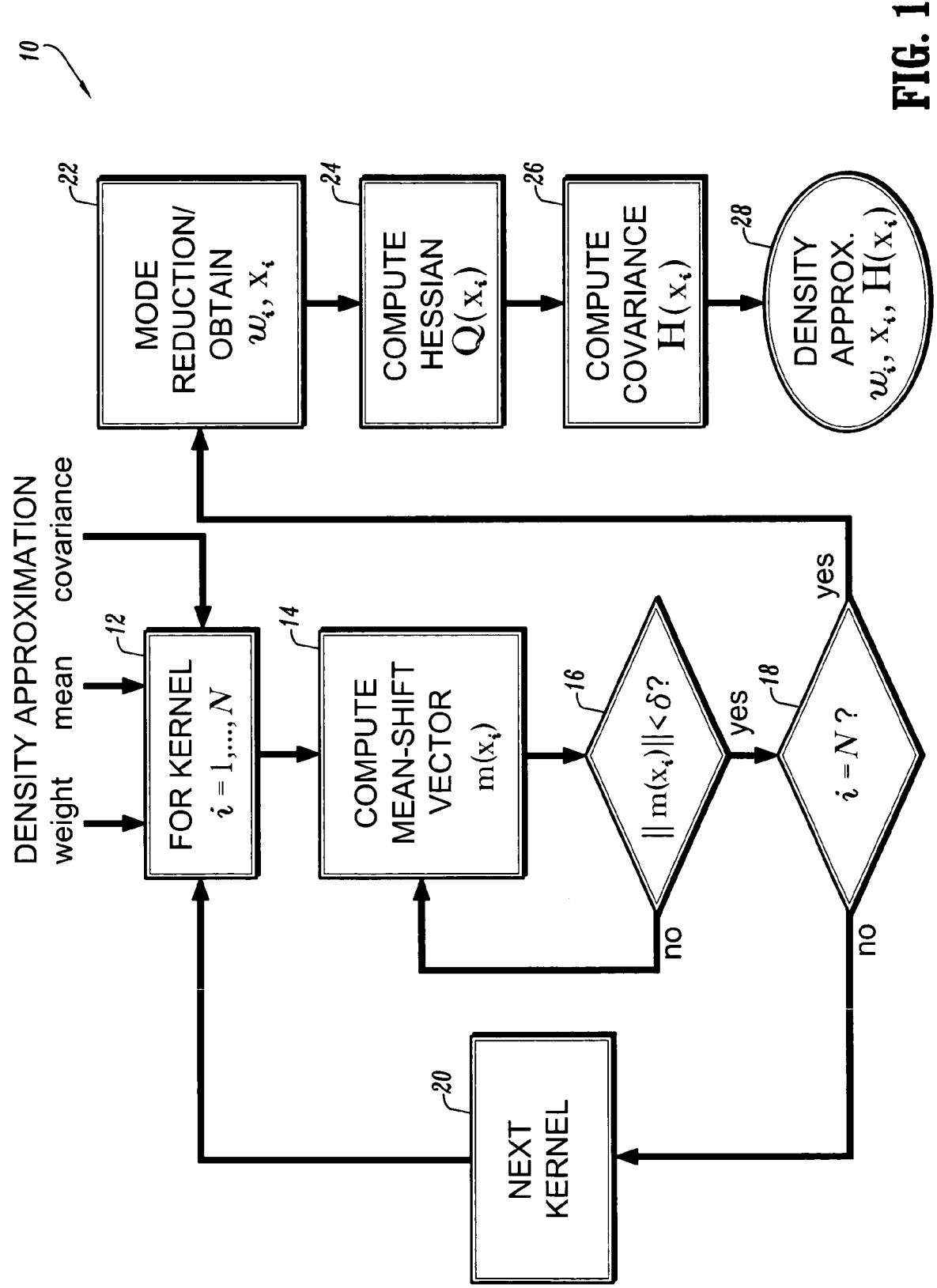
FIG. 1 is a flowchart showing density approximation in an embodiment of the present invention.

FIG. 1 is a flowchart showing density approximation in an embodiment of the present invention. The flowchart depicts the steps of a system 10 that performs density approximation. At step 12 an iterative process in the form of a loop for all kernels is initiated where the kernels are numbered from 1 to n. For each kernel a mean shift vector $m(x_i)$ is computed using the inputs of weights, means and covariances. The computed mean shift vector is checked at step 16 for the condition that the norm of the mean shift vector $x_i$, is less than delta, which is a small number indicating that the size of mean-shift vector is almost zero. If the condition is not satisfied, mean shift vector is computed again at new location $x_i$, and this procedure is repeated until the condition is met. At steps 18 and 20, the iteration repeats if the counter i is less than or equal to the total number of kernels N.

After all the kernels are processed, the process jumps to mode reduction at step 22. The number of modes are reduced, and the weights $w_i$ and the convergences at mode $x_i$ are determined. By iteratively computing the mean shift vectors and translating the location x by m(x), a mode seeking algorithm is obtained that that makes the data points converge to a stationary point of the density. Hessians $Q(x_i)$ are computed for each mode $x_i$ at step 24 and covariance $H(x_i)$ for each mode is decided based on the Hessians. Finally, densities are approximated using mode locations $x_i$ the weights, and Hessians $H(x_i)$ at step 28. The steps performed during operation of the system 10 are described in further detail below.

An illustration of the kernel density approximation with adaptive bandwidth and an iterative procedure for mode detection based on the variable-bandwidth mean shift is described next. In the illustration $x_i$, i=1 ... n is a set of d-dimensional points in the space $R^d$ and a symmetric positive is assumed to have a definite d×d bandwidth $H_i$ is associated with each data point $x_i$. The sample point density estimator with d-variate normal kernel, computed at the point x is given by the equation:

$$\hat{f}(x) = \frac{1}{n} \frac{1}{(2\pi)^{d/2}} \sum_{i=1}^{n} \frac{1}{|H_i|^{1/2}} \exp\left(-\frac{1}{2} D^2(x, x_i, H_i)\right) \quad (1)$$

where, $$D^2(x, x_i, H_i) \equiv (x - x_i)^T H_i^{-1} (x - x_i) \quad (2)$$

is the Mahalanobis distance from x to $x_i$. It is clear that the density at x is obtained as the average of Gaussian densities centered at each data point $x_i$ and having the covariance $H_i$.

$$m(x) = H_h(x) \sum_{i=1}^{n} w_i(x) H_i^{-1} x_i - x \quad (3)$$

$$= \left(\sum_{i=1}^{n} w_i(x) H_i^{-1}\right)^{-1} \left(\sum_{i=1}^{n} w_i(x) H_i^{-1} x_i\right) - x$$

where, $$H_h^{-1}(x) = \sum_{i=1}^{n} w_i(x) H_i^{-1} \quad (4)$$

and the weights:

$$w_i(x) = \frac{|H_i|^{-1/2} \exp\left(-\frac{1}{2} D^2(x, x_i, H_i)\right)}{\sum_{i=1}^{n} \kappa_i |H_i|^{-1/2} \exp\left(-\frac{1}{2} D^2(x, x_i, H_i)\right)} \quad (5)$$

satisfy the equation, $$\sum_{i=1}^{n} w_i(x) = 1$$

By iteratively computing the mean shift and translating the location x by m(x), a mode seeking algorithm is obtained, which converges to a stationary point of the density given by the equation (1). Since the maxima of the density are the only stable points of the iterative procedure, most of the time the convergence happens at a mode of the underlying density. A formal check for the maximum involves the computation of the Hessian matrix:

$$\hat{Q}(x) \equiv (\nabla \nabla^T) \hat{f}(x) = \frac{1}{n} \frac{1}{(2\pi)^{d/2}} \quad (6)$$

$$\sum_{i=1}^{n} \frac{1}{|H_i|^{1/2}} \exp\left(-\frac{1}{2} D^2(x, x_i, H_i)\right) H_i^{-1} ((x_i - x)(x_i - x)^T - H_i) H_i^{-1}$$

which should be negative definite (i.e., having all eigen values negative) at the mode location.

Each Gaussian receives a weight $u_i$ with $$\sum_{i=1}^{n} u_i = 1.$$

The density (1) becomes:

$$\hat{f}(x) = \frac{1}{(2\pi)^{d/2}} \sum_{i=1}^{n} \frac{u_i}{|H_i|^{1/2}} \exp\left(-\frac{1}{2} D^2(x, x_i, H_i)\right) \quad (7)$$

which represents a mixture of Gaussian components. All the equations from above remain the same except for those defining the weights $w_i$ $$w_i(x) = \frac{u_i |H_i|^{-1/2} \exp\left(-\frac{1}{2} D^2(x, x_i, H_i)\right)}{\sum_{i=1}^{n} \kappa_i |H_i|^{-1/2} \exp\left(-\frac{1}{2} D^2(x, x_i, H_i)\right)} \quad (8)$$

and the Hessian $\hat{Q}(x)$ $$\hat{Q}(x) \equiv (\nabla \nabla^T) \hat{f}(x) = \frac{1}{(2\pi)^{d/2}} \quad (9)$$

$$\sum_{i=1}^{n} \frac{u_i}{|H_i|^{1/2}} \exp\left(-\frac{1}{2} D^2(x, x_i, H_i)\right) H_i^{-1} ((x_i - x)(x_i - x)^T - H_i) H_i^{-1}$$

This framework is used to propagate modes for sequential density approximation as described next. Recursive density approximation relies on the propagation of the density. At each time step, the modes of the density are re-estimated and a Gaussian component is assigned to each mode. A single Gaussian component can be assigned to a single mode, hence reducing the amount of memory required to represent the modes and the density function. The covariance of each component is derived from a Hessian matrix estimated at the mode location. Covariance is estimated accurately by using the Hessian at the mode location.

Variable-bandwidth mean shift is used to detect the modes. While the density representation is memory efficient, it inherits the flexibility of non-parametric techniques, by allowing the number of modes to adapt in time. The same mode propagation principle applies to subspaces derived from eigen analysis.

At a given time t the underlying density has $n_t$ modes (maxima) and that for each mode we have allocated a Gaussian N ($u_i$, $x_i$, $H_i$), according to equation (7). To illustrate, a learning rate is taken to be $\alpha$ and all incoming data is to be part of the model. Let N ($u_t$, $x_t$, $H_t$) be a new measurement. With the integration of the new measurement the density at time t is expressed as:

$$\hat{f}_t(x) = \frac{\alpha}{(2\pi)^{d/2}|H_t|^{1/2}} \exp\left(-\frac{1}{2}D^2(x, x_t, H_t)\right) + \qquad (10)$$

$$\frac{1-\alpha}{(2\pi)^{d/2}} \sum_{i=1}^{n_t} \frac{u_i}{|H_i|^{1/2}} \exp\left(-\frac{1}{2}D^2(x, x_i, H_i)\right)$$

Starting from the locations $x_t$ and $x_i$ with i=1 ... $n_t$ mean shift iterations are performed, and it is assumed that convergence locations are $x_t^c$ and $x_i^c$ where i=1 .... $n_t$. Select first, the convergence location at which more than one procedure converged. Let y be a point in this set and $x_{i_j}$, j=1 ... m be the starting locations for which the mean shift procedure converged to y. If the Hessian $\hat{Q}_t(y)=(\nabla\nabla^T)\hat{f}_{t(y)}$ is negative definite, the mode y is associated with a Gaussian component defined by N($u_y$, y, H(y)) where the weight is:

$$u_y = \sum_{j=1}^{m} u_{i_j} \qquad (11)$$

and the covariance is defined by:

$$H(y) = u_y^{\frac{2}{d+2}} \left|2\pi\left(-\hat{Q}_t(y)\right)^{-1}\right|^{-\frac{1}{d+2}} \left(-\hat{Q}_t(y)^{-1}\right) \qquad (12)$$

At time t+1 the Gaussian components located at $x_{i_j}$, j=1 ... m will be substituted by the new Gaussian N($u_y$, y, H(y)).

If the Hessian $\hat{Q}_t(y)$ is not negative definite (i.e., the location y is either a saddle point or a local minimum), all the components associated with $x_{ij}$, j=1 ... m are left unchanged since the Gaussian approximation in the neighborhood y would yield a too high error.

For convergence locations at which only one procedure converged, the weight, mean and covariance of the associated Gaussian component (as given in the Equation (10)) are also left unchanged.

FIGS. 2(a) to 2(h) are simulation graphs generated during the operation of an embodiment of the present invention. Equation (10) represents the density function $\hat{f}_{t(x)}$ and is used to derive $\hat{f}_{t+1(x)}$. The number of Gaussians, $n_{t+1}$ can increase or decrease with respect to $n_t$, as a function of the increase or decrease in the complexity of the underlying density at the time t+1, as represented by the number of modes.

FIGS. 2(a) to 2(h) illustrate the application of mode propagation framework in one dimension. Measurements range about 500 and learning rate of about $\alpha$=0.05 is used for measurements.

Figures 2A, 2B:
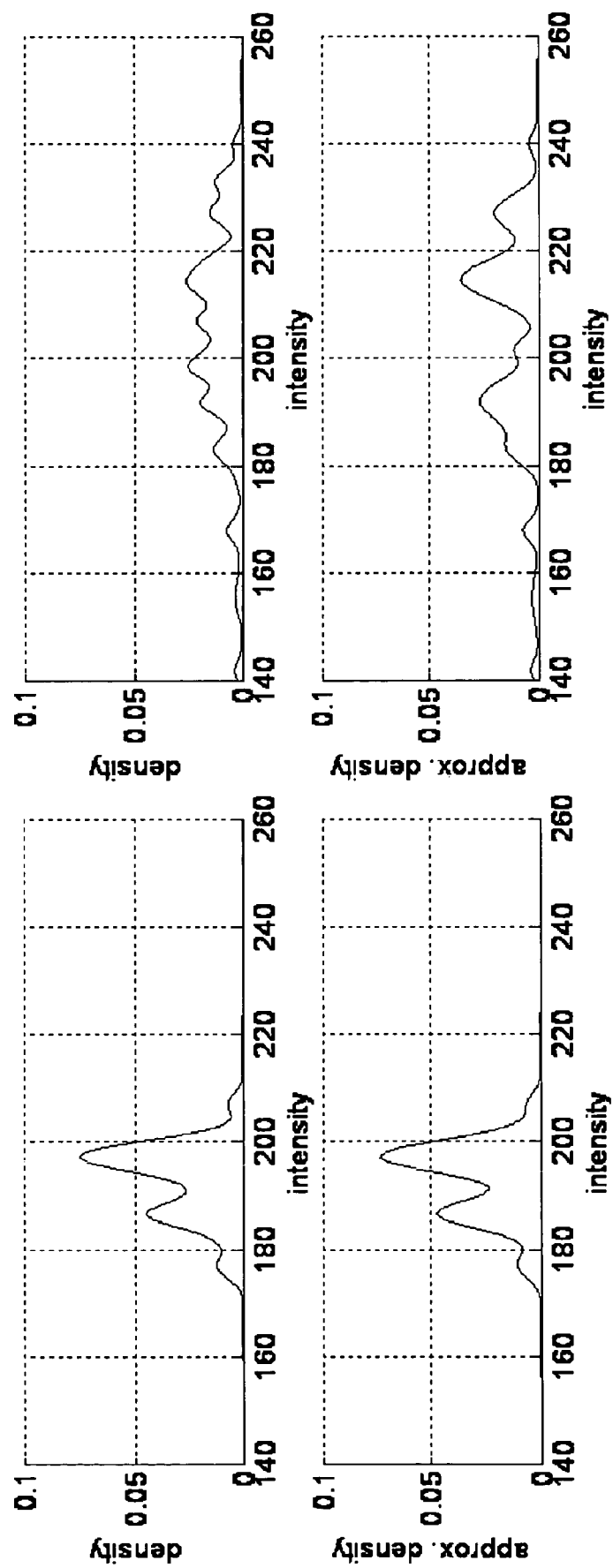
FIGS. 2(*a*)-2(*h*) are one dimensional mode propagation simulation graphs generated during the operation of an embodiment of the present invention.
Figures 2C, 2D:
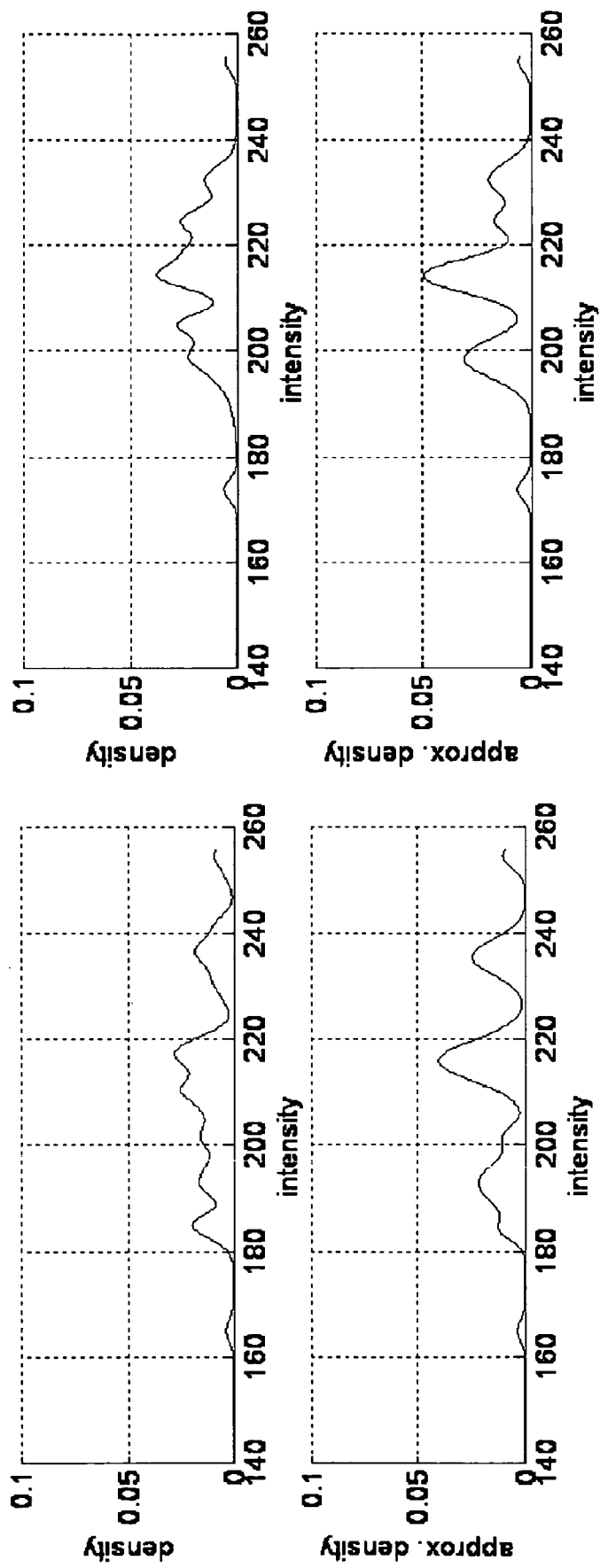
Figures 2E, 2F:
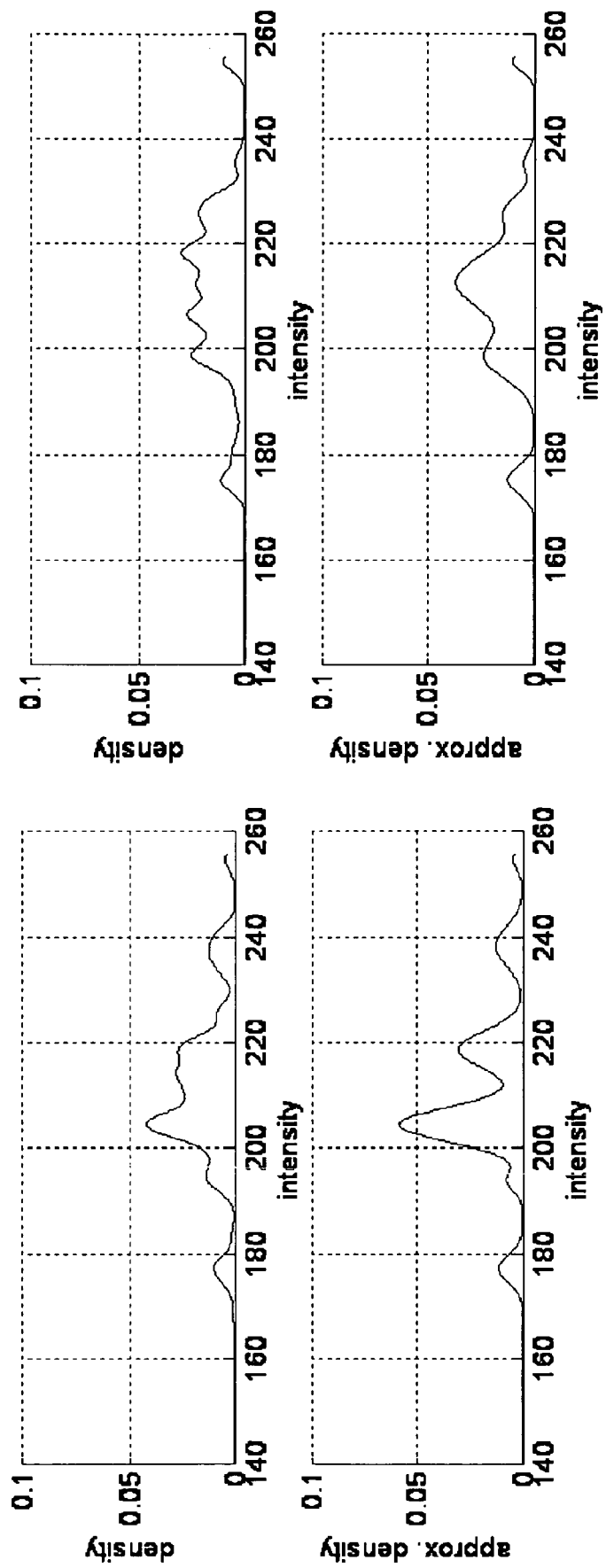
Figure 2H:
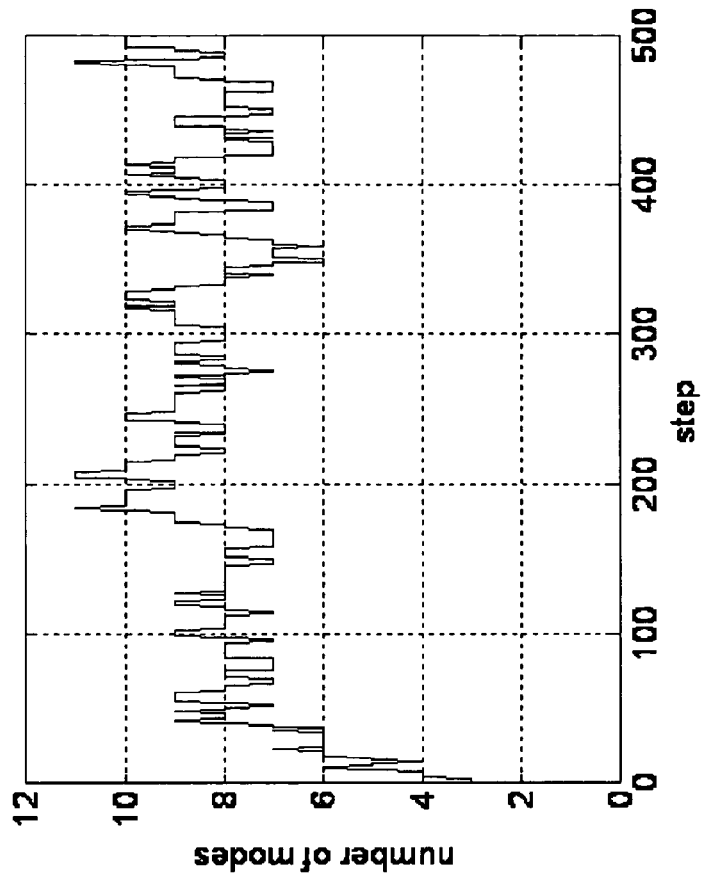
Figure 2G:
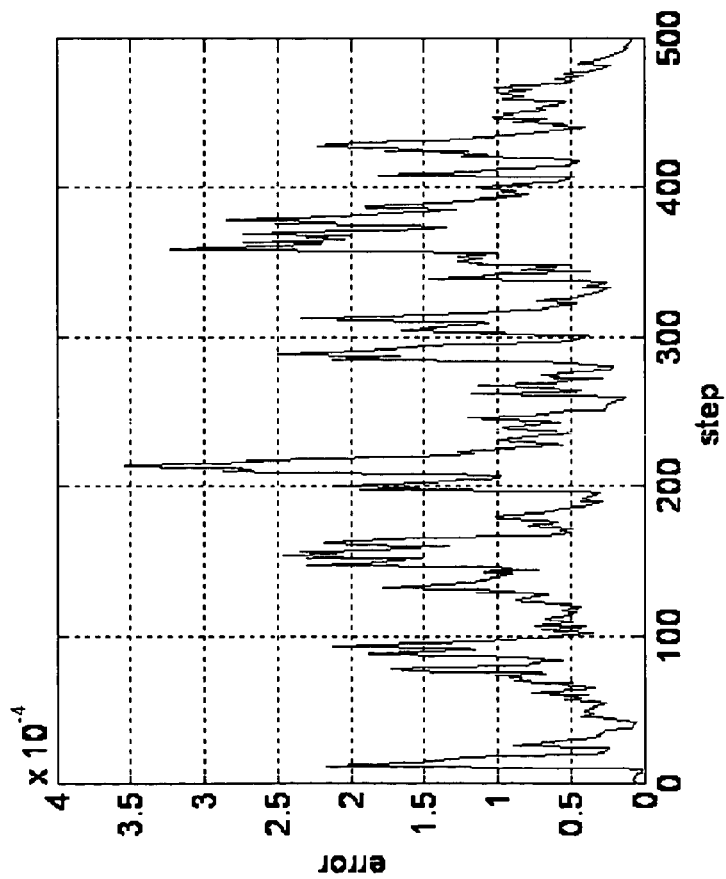

FIGS. 2(a) to 2(h) show both the standard non-parametric estimate of the density and the density computed using mode propagation. Steps 0, 60, 120, 180, 240 and 300 are shown on the X-axis. FIG. 2(a)-(f) show standard non-parametric density estimation. FIG. 2(g) shows the mean integrated square error; and FIG. 2(h) shows the number of modes.

Figures 3A, 3B:
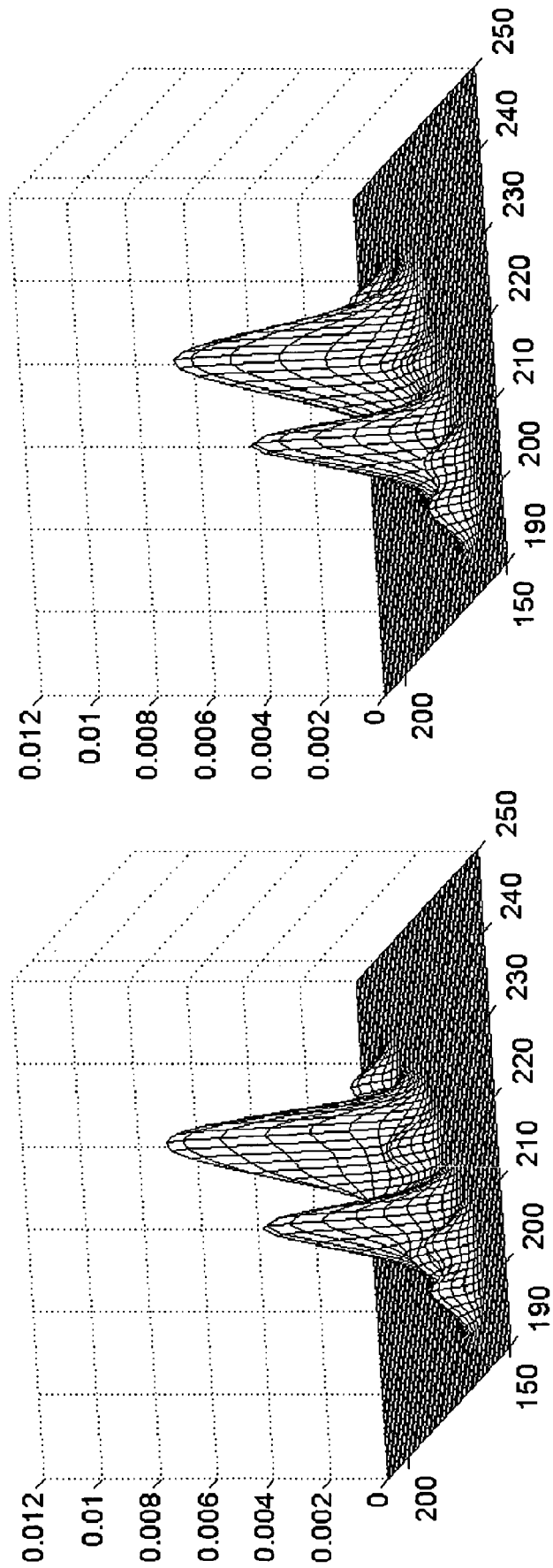
FIGS. 3 (*a*)-(*f*) show an exemplary two dimensional mode propagation.
Figures 3C, 3D:
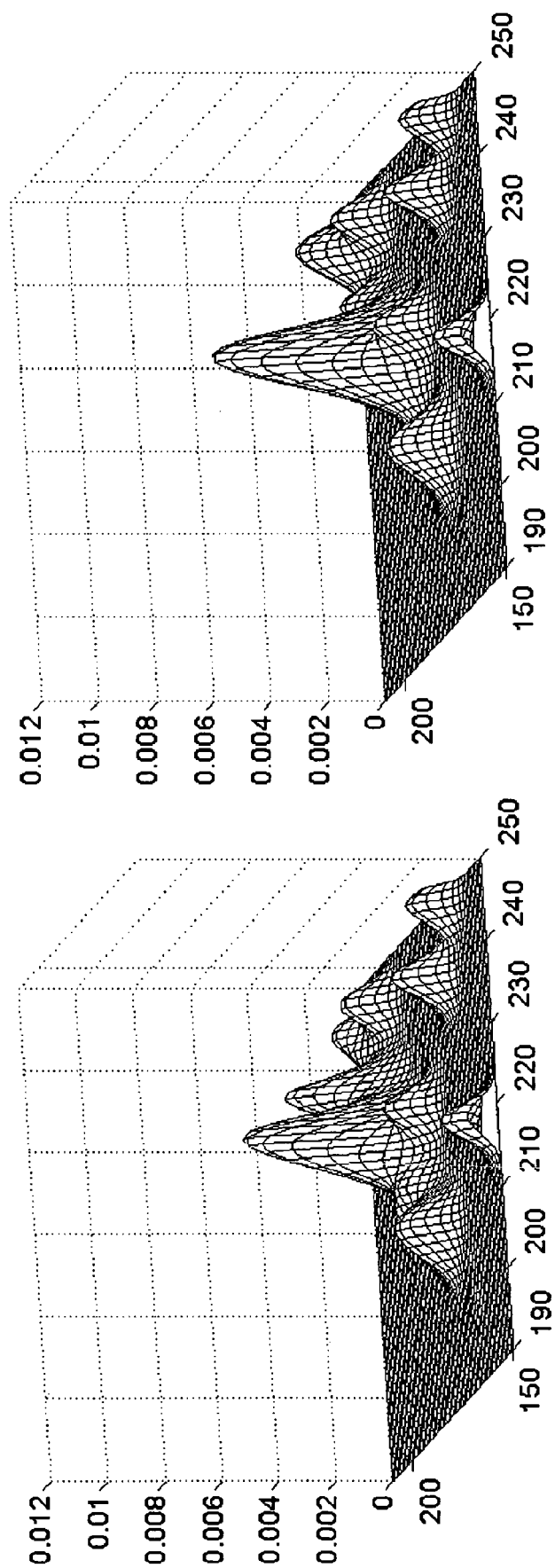

FIGS. 3(a)-(f) show two dimensional mode propagation. FIG. 3(a) and 3(c) show standard non-parametric density estimation. FIG. 3(b) and (d) show density computed through mode propagation. Steps 0 and 60 are represented. FIG. 3(e) shows mean integrated squared error. FIG. 3(f) shows the number of modes.

Close relationship between the standard kernel density estimation and the density computed through mode propagation is observed, and density function has been approximated with only ten modes at the 60$^{th}$ step. The amount of memory required to represent this density function non-parametrically is much higher than in the case of mode propagation.

Mode propagation can be extended to subspaces obtained from eigen analysis, while eigenspace updating is implemented though incremental PCA. Multiple p dimensional data are denoted by $m_i$, i=1, 2, . . . , k, having mean and covariance m and P. Matrix of eigen-vectors of P is denoted by E. The largest q eigenvalues and corresponding eigenvectors $e_i$, i=1,2, . . . , q, are selected and hence the original p dimensional space is reduced to q dimensions where q<p.

$E_q$ is defined to be a p×q matrix whose columns are eigen vectors and project the data from the original space into the q dimensional subspace by the simple matrix-vector multiplication as $m_i^q=E_q^T m_i$. Using the projected data $m_i^q$, the mode finding algorithm is performed in same manner as described above in detail. Using the Hessian computed at the mode location, the covariance of each mode is derived in the subspace for which the mean $\hat{m}_i$(i=1,2,...,n) of each mode in the original space is required.

Incremental Principal Component Analysis (PCA) is described next. As the requisite amount of information is not available, the data representation in the current subspace has to be converted into the next subspace. The information available includes an old eigenvector ($E_q$), new eigenvector ($E'_q$), mean and covariance for the density in the old subspace, new data $m_{k+1}$ and mean of each mode $\hat{m}_i$ in the original space. Instead of projecting each mode from the old subspace to the new subspace, the mean of each mode $\hat{m}_i$ is projected into the new subspace as:

$$m'^q_i = E'^T_q \hat{m}_i \qquad (13)$$

and the new data can be projected to the new subspace as below:

$$m'^q_{k+1} = E'^T_q \hat{m}_{k+1} \qquad (14)$$

With the means and covariances of the re-projected density and the new data, the sequential density approximation algorithm is performed and the modes are propagated to the next step. At this time, the mean of each mode $\hat{m}_i$ is updated according to the result of mode finding procedure and the learning rate $\alpha$.

Figures 4A, 4B:
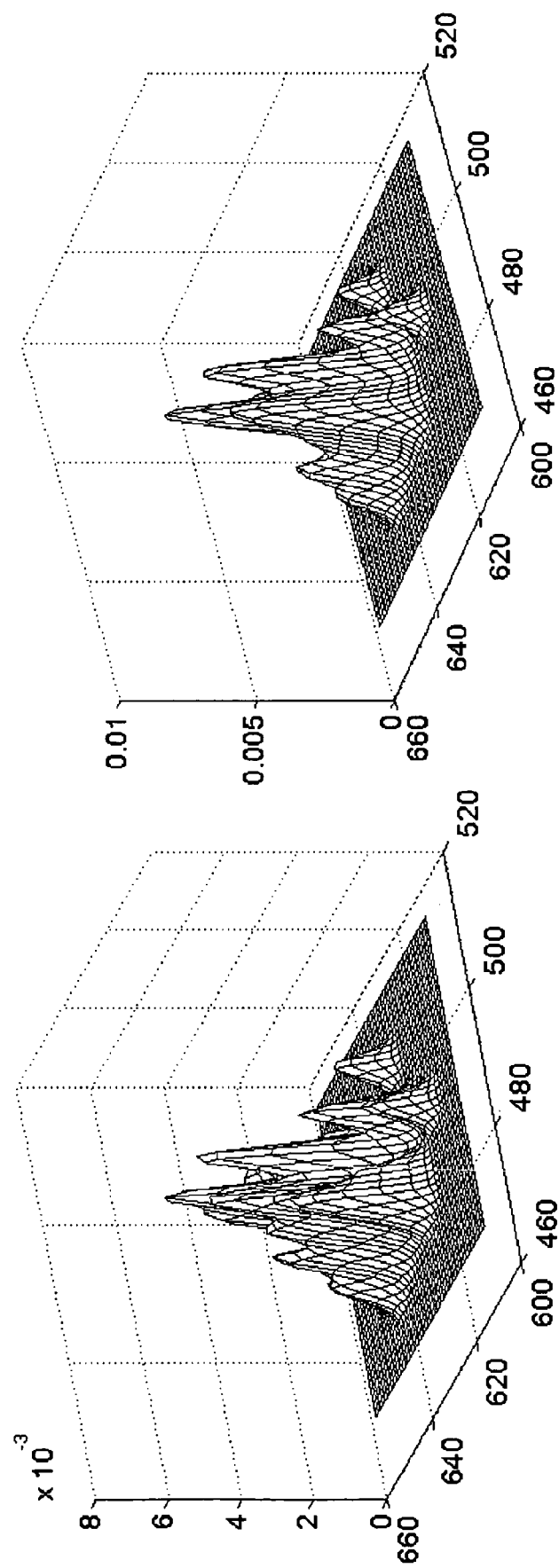
FIGS. 4(*a*)-4(*d*) shows mode propagation in a two dimensional subspace.
Figure 4D:
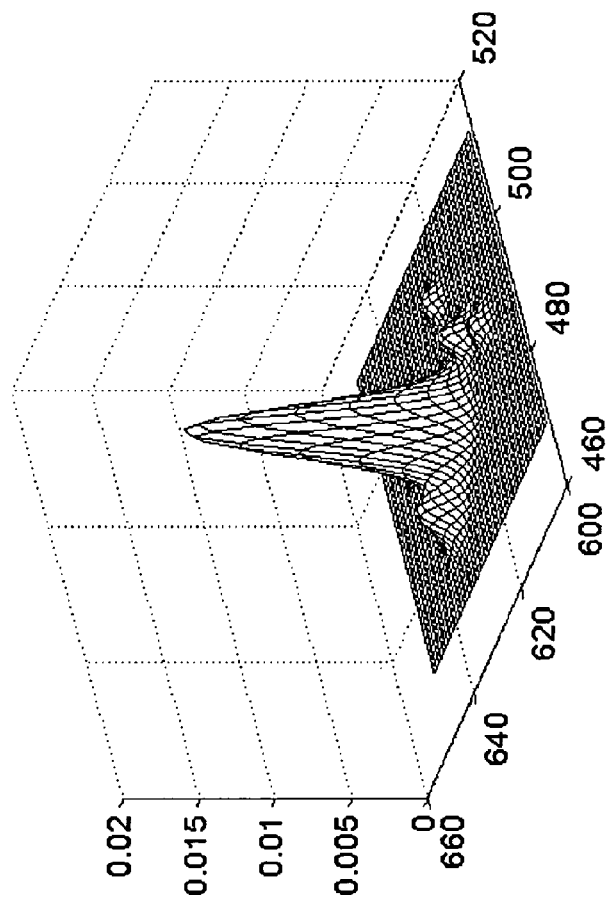
Figure 4C:
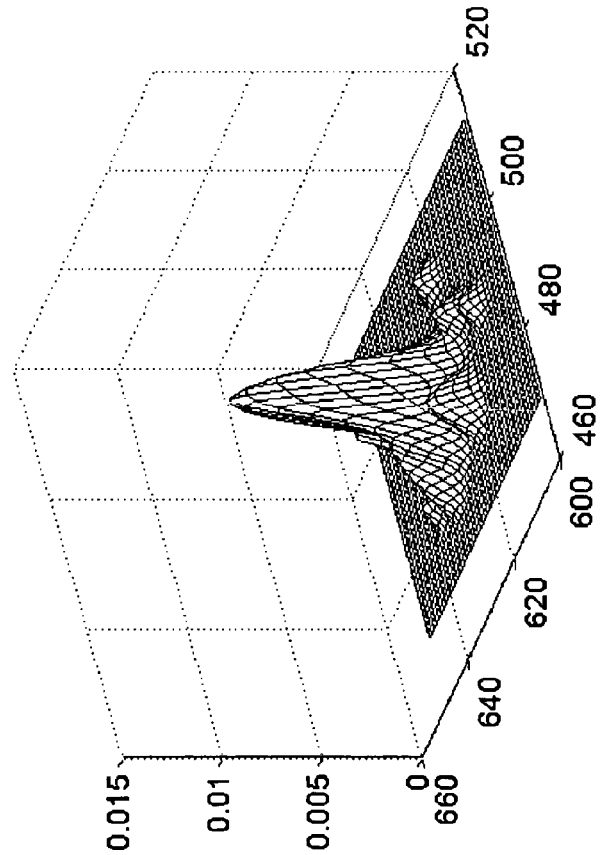

FIGS. 4(a)-4(d) shows mode propagation in a two dimensional subspace. FIGS. 4(a) and 4(c) show standard non-parametric density estimation. FIGS. 4(b) and (d) show density computed through mode propagation. Steps 0 and 50 are represented.

Figure 5:
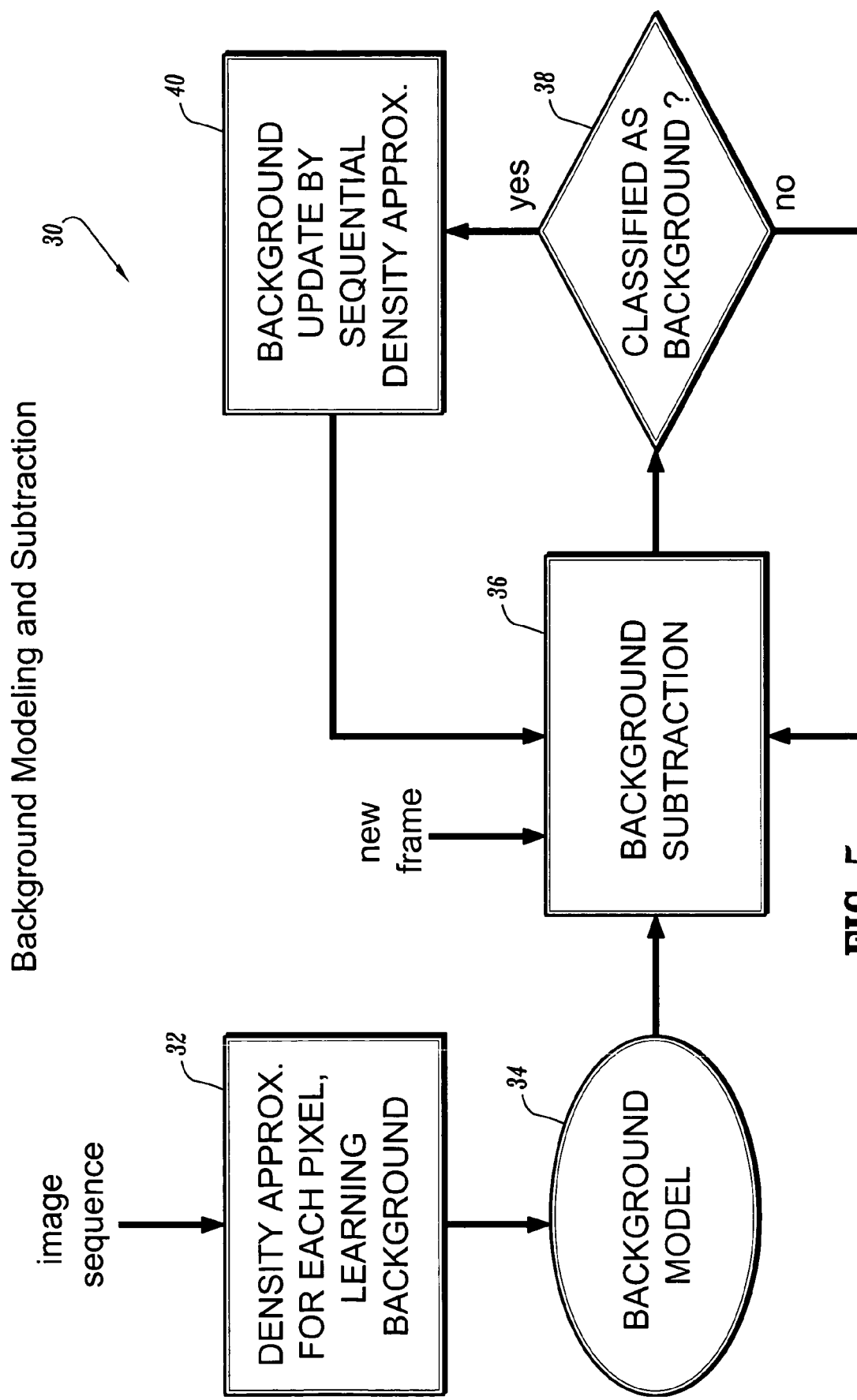
FIG. 5 is a flowchart for an illustrative background modeling application in an embodiment of the present invention.

Based on the kernel density approximation explained above, background modeling and subtraction is performed. FIG. 5 is a flowchart for an illustrative background modeling application 30 in an embodiment of the present invention. At step 32 the received image sequence is processed to approximate density for each pixel to determine the background of the received image. A background model having mixtures of several Gaussians is constructed using the above described techniques. The received image is processed pixel-wise or as blocks of fixed size. At step 34 a background model is created and at step 36 background subtraction is performed to separate the background image from the foreground image.

The subtracted background is further checked at step 38 for valid classification as background. If the subtracted background image is validly classified as background then at step 40 then the background is updated by sequential density approximation after which the process iterates back to step 36 for background subtraction. The density of the probability density function describing the background model is updated only if the new frame data is classified as background. A unit of the image is considered foreground if the feature of the unit is far (e.g., outside 99.9 percent confidence ellipsoid) from every mode in the underlying density function. Only after verifying that the new data is verified to be background related data, the background model is updated using the sequential density approximation as described above in detail. The whole process for background modeling iterates till new frames are received and the process ends when there are no more new frames to be processed.

In many real-time applications, the data is not available before the processing of information is initiated. Hence, the density function used to model the data captured in real-time has to be updated in an online manner. Hence, when new data (Gaussian) is added to the current density function, mode finding is performed and density can be properly approximated with minimal amount of memory required at each step in the process.

Figure 6:
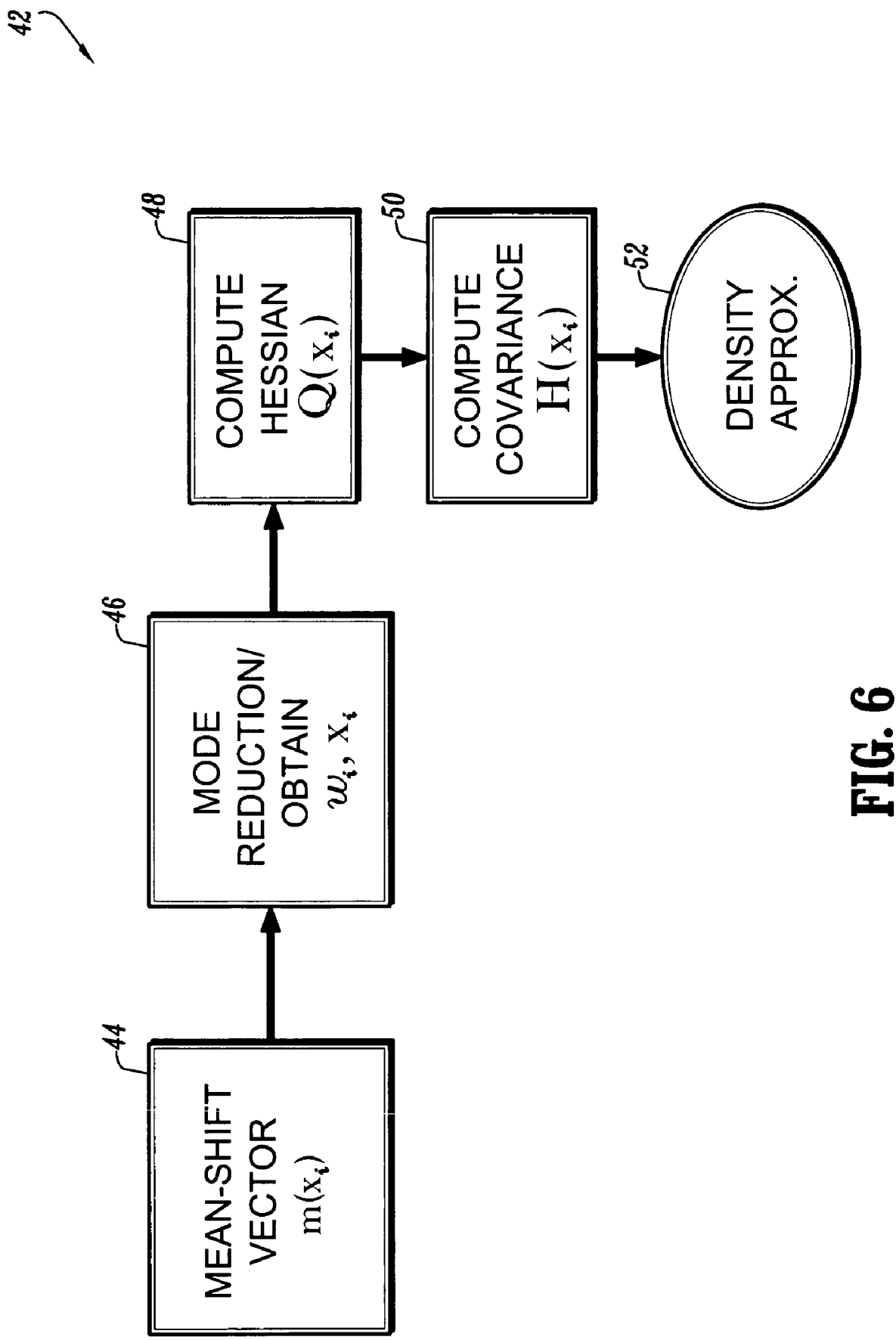
FIG. 6 is a block diagram of an exemplary system for sequential kernel density estimation through mode propagation in an embodiment of the present invention.

FIG. 6 is a block diagram of an exemplary system for sequential kernel density estimation through mode propagation in an embodiment of the present invention. The blocks in FIG. 6 are computational modules that can be implemented in a software or hardware system as described below in detail. In the system 42, a module 44 generates mean-shift vectors that processed to reduce modes by the module 46 as described above. Module 48 computes Hessians and module 50 generates covariance for all data points. Module 52 approximates densities. The detailed operation of the above modules is described above in context of FIG. 1.

Figure 7:
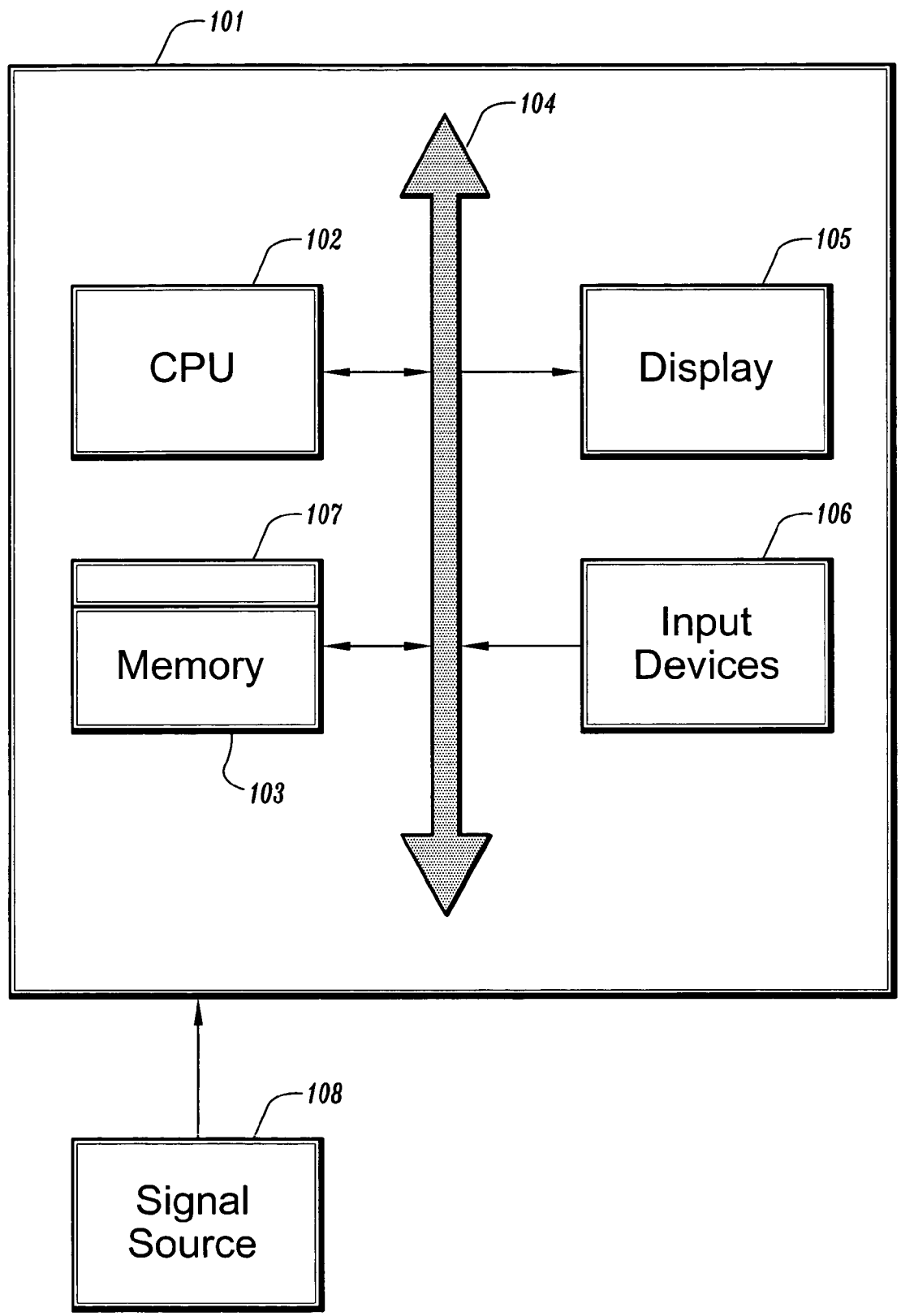
FIG. 7 is a block diagram of a computer system used to implement the present invention.

Referring to FIG. 7, according to an embodiment of the present invention, a computer system 101 for implementing the present invention can comprise, inter alia, a central processing unit (CPU) 102, a memory 103 and an input/output (I/O) interface 104. The computer system 101 is generally coupled through the I/O interface 104 to a display 105 and various input devices 106 such as a mouse and keyboard. The support circuits can include circuits such as cache, power supplies, clock circuits, and a communications bus. The memory 103 can include random access memory (RAM), read only memory (ROM), disk drive, tape drive, etc., or a combination thereof. The present invention can be implemented as a routine 107 that is stored in memory 103 and executed by the CPU 102 to process the signal from the signal source 108. As such, the computer system 101 is a general purpose computer system that becomes a specific purpose computer system when executing the routine 107 of the present invention.

The computer platform 101 also includes an operating system and micro instruction code. The various processes and functions described herein may either be part of the micro instruction code or part of the application program (or a combination thereof) which is executed via the operating system. In addition, various other peripheral devices may be connected to the computer platform such as an additional data storage device and a printing device.

It is to be further understood that, because some of the constituent system components and method steps depicted in the accompanying figures may be implemented in software, the actual connections between the system components (or the process steps) may differ depending upon the manner in which the present invention is programmed. Given the teachings of the present invention provided herein, one of ordinary skill in the related art will be able to contemplate these and similar implementations or configurations of the present invention.

While the present invention has been particularly shown and described with reference to exemplary embodiments thereof, it will be understood by those skilled in the art that various changes in form and details may be made therein without departing from the spirit and scope of the present invention as defined by the appended claims.

What is claimed is:

1. A system for sequential kernel density approximation in video data comprising frames, the system comprising:
a mean-shift vector module for finding a gradient ascent direction in a density function, wherein the density function determines a plurality of modes in each frame of the video data, the modes corresponding to potential visual features to be tracked between frames, and a mode reduction module reduces the number of modes located in each frame of the video data, wherein each mode location is a visual feature to be tracked;
a Hessian module for generating at least one Hessian matrix corresponding to the mode location of the visual feature in each frame of the video data;
a covariance module for determining a covariance of the modes using the Hessian matrix; and
a density approximation module for determining an update to the density function at each of the mode locations using the Hessian matrix and the covariance, wherein the update tracks the visual feature in the video data between frames.

2. The system of claim 1, wherein the density function is represented as a weighted sum of Gaussians, wherein the weighted sum of Gaussians having weights, means and covariances.

3. The system of claim 2, wherein the mean-shift vector module iteratively determines at least one mode location for at least one mode in at least one density function based on the weights, means and covariances.

4. The system of claim 3, wherein the iterative operation of the mean-shift vector module converges to a stationary point of density.

5. The system of claim 4, wherein the stationary point of density is the mode.

6. The system of claim 1, wherein the mode comprises:
a Gaussian component corresponding to the mode location, wherein the Gaussian component having its mean equivalent to the mode location.

7. The system of claim 6, wherein the covariance of the Gaussian corresponding to the mode is derived from the Hessian matrix.

8. The system of claim 1, wherein the a mean-shift vector module determines at least one mode location for at least one mode using a variable-bandwidth mean shift vector represented by m(x), wherein $$m(x) = H_h(x) \sum_{i=1}^{n} w_i(x) H_i^{-1} x_i - x$$

$$= \left( \sum_{i=1}^{n} w_i(x) H_i^{-1} \right)^{-1} \left( \sum_{i=1}^{n} w_i(x) H_i^{-1} x_i \right) - x.$$

9. The system of claim 1, wherein the Hessian is a Hessian matrix represented by $\hat{Q}(x)$, wherein $$\hat{Q}(x) \equiv (\nabla \nabla^T) \hat{f}(x)$$

$$= \frac{1}{n} \frac{1}{(2\pi)^{d/2}} \sum_{i=1}^{n} \frac{1}{|H_i|^{1/2}} \exp\left(-\frac{1}{2} D^2(x, x_i, H_i)\right) H_i^{-1}$$

$$((x_i - x)(x_i - x)^T - H_i) H_i^{-1}.$$

10. The system of claim 1 wherein the covariance is represented as H(y), wherein $$H(y) = u_y^{\frac{2}{d+2}} \left| 2\pi \left( -\hat{Q}_t(y) \right)^{-1} \right|^{-\frac{1}{d+2}} \left( -\hat{Q}_t(y)^{-1} \right).$$

11. The system of claim 1, wherein the Hessian is a negative definite and the density approximation module updates the density function.

12. The system of claim 1, wherein the Hessian is a convergence location for the mean shift vector module and is at least one of a saddle point and a local minimum, and the density approximation module retains data associated with the mode.

13. A program storage device readable by machine, tangibly embodying a program of instructions executable by the machine to perform method steps for sequential kernel density estimation in video data comprising frames, the method steps comprising:
   finding a gradient ascent direction in at least one density function using a mean-shift vector, wherein the density function determines a plurality of modes in each frame of the video data, the modes corresponding to potential visual features to be tracked between frames, and reducing the number of modes located in each frame of the video data, wherein each mode location is a visual feature to be tracked;
   generating at least one Hessian corresponding to the mode location of the visual feature in each frame of the video data;
   determining a covariance of the modes using the Hessian matrix; and
   approximating density to determine an update to the density function at each of the mode locations using the Hessian matrix and the covariance, wherein the update tracks the visual feature in the video data between frames.

14. The system of claim 13 where in the density function is represented as a weighted sum of Gaussians, wherein the weighted sum of Gaussians having weights, means and covariances.

15. The system of claim 14 wherein the mean-shift vector iteratively determines at least one mode location for at least one mode in at least one density function based on the weights, means and covariances.

16. The system of claim 15 wherein the iterative operation of the step of determining at least one mode location converges to a stationary point of density.

17. The system of claim 16 wherein the stationary point of density is the mode.

18. The system of claim 13 wherein the mode comprises:
   a Gaussian component corresponding to the mode location, wherein the Gaussian component having its mean equivalent to the mode location.

19. The system of claim 18 wherein the covariance of the Gaussian corresponding to the mode is derived from the Hessian.

20. The system of claim 13 wherein a mean-shift vector module determines at least one mode location for at least one mode using a variable-bandwidth mean shift vector represented by m(x), wherein $$m(x) = H_h(x) \sum_{i=1}^{n} w_i(x) H_i^{-1} x_i - x$$

$$= \left( \sum_{i=1}^{n} w_i(x) H_i^{-1} \right)^{-1} \left( \sum_{i=1}^{n} w_i(x) H_i^{-1} x_i \right) - x.$$

21. The system of claim 13 wherein the Hessian is a Hessian matrix represented by $\hat{Q}(x)$ wherein $$\hat{Q}(x) \equiv (\nabla \nabla^T) \hat{f}(x)$$

$$= \frac{1}{n} \frac{1}{(2\pi)^{d/2}} \sum_{i=1}^{n} \frac{1}{|H_i|^{1/2}} \exp\left(-\frac{1}{2} D^2(x, x_i, H_i)\right) H_i^{-1}$$

$$((x_i - x)(x_i - x)^T - H_i) H_i^{-1}.$$

22. The system of claim 13 wherein the covariance is represented as H(y), wherein $$H(y) = u_y^{\frac{2}{d+2}} \left| 2\pi \left( -\hat{Q}_t(y) \right)^{-1} \right|^{-\frac{1}{d+2}} \left( -\hat{Q}_t(y)^{-1} \right).$$

23. The system of claim 13 wherein the Hessian is a negative definite and the step of determining the plurality of modes updates the density function at the plurality of modes.

24. The system of claim 23 wherein the step of determining the plurality of modes updates the density mode function by associating a first Gaussian component with the mode at a first time step and associating a second Gaussian component with the mode at a second time step, wherein the mode being a location where the mean shift vector module has at least two convergences.

25. The system of claim 13 wherein the Hessian is a convergence location for the step of determining the plurality of modes and the convergence location at least one of a saddle point and a local minimum, and the step of approximating density retains data associated with the mode.

26. The system of claim 13 wherein the Hessian is the only convergence location for the mean-shift vector, and the step of approximating density retains data associated with the mode.

27. A method for sequential kernel density estimation in video data for a first sub-space, the method comprising:
- determining a matrix of eigen vectors of the covariance of multi-dimensional data corresponding to at least one visual feature in video data to be tracked between frames of the video data, wherein a plurality of modes is determined in the first sub-space corresponding to a plurality of potential visual features and the number of modes located in the first sub-space is reduced to locate the at least one visual feature;
- selecting a first set of eigen values corresponding to a first set of eigen vectors;
- projecting data from the first sub-space on to a second sub-space; and
- performing mode finding in the second sub-space, wherein the mode finding tracks the at least one visual feature in the video data between frames.

28. The method of claim 27 wherein the second sub-space has lesser dimension than the first subspace.

29. The method of claim 28 wherein the step of projecting uses matrix multiplication to project the first sub-space on to a second sub-space.

30. A method for background modeling for an image sequence, the method comprising:
- (a) receiving an image frame;
- (b) approximating density for each pixel of the image frame to determine a background;
- (c) creating a background model using the approximated density;
- (d) receiving another image frame wherein the image frames constitute a sequence of images;
- (e) subtracting background from the another image frame according to the background model;
- (f) determining the validity of background classification for the another image frame;
- (g) updating the background using sequential kernel density approximation;
- (h) repeating steps (d) through (g) until all frames of the image sequence have been processed; and
- (i) outputting the image sequence with the background subtracted.

31. The method of claim 30 where in the step of updating further comprising:
- determining at least one mode location for at least one mode in at least one density function of the approximated density using a mean-shift vector;
- generating at least one Hessian corresponding to the mode location;
- determining a covariance of the mode using the Hessian matrix; and
- approximating density to determine an update to the density function at the mode location using the Hessian matrix and the covariance.

* * * * *